Feb. 24, 1970    H. SEIP    3,497,036
WHEEL-BRAKE CYLINDER WITH PISTON-STOP MEANS
Filed Oct. 3, 1967    2 Sheets-Sheet 1

INVENTOR.
HERMANN SEIP
BY
Karl F. Ross
ATTORNEY

INVENTOR.
HERMANN SEIP
BY Karl F. Ross
ATTORNEY

United States Patent Office 3,497,036
Patented Feb. 24, 1970

3,497,036
WHEEL-BRAKE CYLINDER WITH
PISTON-STOP MEANS
Hermann Seip, Bad Vilbel, Germany, assignor to Alfred
Teves G.m.b.H., Frankfurt am Main, Germany, a corporation of Germany
Filed Oct. 3, 1967, Ser. No. 672,509
Claims priority, application Germany, Nov. 15, 1966,
T 32,516
Int. Cl. F16d 55/00, 65/38
U.S. Cl. 188—73                                    5 Claims

ABSTRACT OF THE DISCLOSURE

A brake-cylinder assembly for a disk brake system having means for limiting contact of the brakeshoe with the brake upon excessive wear of the brake lining, including a rod secured to the housing and extending into the wheel-brake cylinder in the direction of displacement of said piston, a resilient stop (e.g. stacked Belleville washers) mounted on the rod, and an annular abutment formed on the piston and engageable with the stop upon fluid pressurization of the cylinder and wear of the brake lining to a predetermined extent.

My present invention relates to brake-cylinder assemblies and, more particularly, an improved wheel-brake assembly for an automotive-vehicle brake system in which brakeshoes having wearable brake linings are thrust by the assembly against rotating braking faces.

Wheel-brake cylinders are commonly used in automotive vehicle brakes of different types, these brakes being generally classifiable in one of two categories, namely disk-type brakes and drum-type brakes. In brakes of the latter kind, the rotatable braking face, generally carried by the wheel or axle of an automotive vehicle, consists of a cylindrical surface or brake drum surrounding the brake shield upon which the brakeshoes and wheel-brake cylinder are mounted. The brakeshoes are constituted by cylindrical segments adapted to be urged outwardly (internal expansion) by the wheel-brake cylinder whose piston is shiftable toward the braking surface of the drum and may have an axis perpendicular to the axis of rotation of the drum and parallel to the plane of movement of the brakeshoes. Disk-type brakes, however, make use of a brake disk lying generally in a plane perpendicular to the axis of rotation of the axle or wheel to which it may be connected, the disk being flanked over a portion or segment of its periphery by a brake yoke extending around the disk in this region. The brake yoke carries a pair of brakeshoes which are displaceable perpendicularly to the braking faces of the disk and, usually, parallel to its axis by one or more fluid-responsive cylinders formed in the yoke. In this system, the yoke may be provided with a piston, axially shiftable in the respective cylinder, adapted to drive at least one of the brakeshoes against the respective confronting face of the disk. The other brakeshoe may be drawn against the disk by the other lobe of the yoke or caliper when the latter acts as a force-transmitting member and is displaced by the reaction force on the cylinder. Alternatively, a second wheel-brake cylinder may be provided in this other lobe and can receive a further piston adapted to urge the corresponding brakeshoe against the disk. Still other arrangements make use of floating yokes, swingable yokes, lever mechanisms or toggle systems for applying both brakeshoes to the disk and thereby sandwiching the latter between the shoes. In disk-type brakes, it is generally the practice to attach one of the lobes of the yoke to a support which is relatively nonrotatable and may consist of the axle housing, the other yoke being cantilevered on the supported lobe. In both types of brakes, the brakeshoe generally comprises a backing plate of cast iron, steel or the like, to which a frictionally abraded lining having a high coefficient of friction is riveted, adhesively bonded or otherwise secured. It is not uncommon to reline a brakeshoe several times within the vehicle life. Suitable linings include asbestos compositions or the like designed to be unaffected by oil and other contaminants, to retain frictional characteristics upon wear, to be relatively unaffected by high, frictionally generated temperatures, etc.

In brake systems of both types, difficulties have hitherto arisen upon the wear of the brake lining to substantially the bare surface of the backing plate confronting the braking face of the disk. When this occurs, the actuation of the brake pedal may bring the backing plate into metal-to-metal contact with the brake drum or disk, thereby damaging the latter to the extent that it is unreplaceable or is reparable only at considerable cost. Moreover, brakeshoe wear is normally nonuniform so that one of the shoes may have been stripped of its lining while the other retains some thickness of the lining designed to effect braking action. To avoid these disadvantages, it has already been proposed to provide stops for the brakeshoes on the housing structure or on the brake disk to limit engagement of the metallic backing plate surface with the braking face of the disk. In effect, such systems immobilize one of the brakeshoes while the brakeshoe retaining some of the lining thickness remains effective. The result often is a one-sided stress upon the housing or the disk with the danger of rupture at the point at which the disk is keyed to its shaft or affixed to the wheel or of breakage at the flange by which the brake yoke or housing is secured to the axle housing.

It is, therefore, the principal object of the present invention to provide an improved wheel-brake assembly in which the aforementioned disadvantages are obviated and whereby damage to the brake face of the drum or disk can be limited or avoided upon full lining wear.

Another object of this invention is to provide a wheel-brake system for a disk-brake assembly which avoids overstressing the brake disk upon failure of one or both of the brake linings and also ensures relatively uniform wear of the brake lining, especially when only reduced thicknesses thereof remain upon the backing plates.

I have found that these objects can be attained in a wheel-brake system, especially with disk-type brakes, although the principles are also applicable to drum-type brakes, wherein the piston is axially shiftable within the cylinder and has a closed front end in the direction of the brakeshoe and in force-transmitting relationship with the backing plate thereof for urging the brakeshoe against the braking face of the rotatable member (e.g. disk or drum); the piston, rather than the brakeshoe or disk, is formed with an annular abutment, remote from its closed end and the brakeshoe, engageable with a stack of Belleville or dished-disk washers forming a resilient stop mounted under prestress at the end of a rod extending axially into the piston beyond its annular abutment or shoulder and anchored to the cylinder housing. The distance between the abutment and the resilient stop is, according to this invention, approximately equal to the thickness of the brake lining plus the brake play so that the piston engages the stop when lining wear is substantially complete or is about to be completed. To facilitate construction and assembly of the wheel-brake cylinder, and to ensure a light-weight unit, the wheel-brake piston is provided with a mounting opening upon its head or forward end and is closed at the latter by a plug or cap threaded into or onto the latter. Advantageously, the assembly may comprise a self-adjusting mechanism for compensating the wear of the brake lining, this mechanism resetting the rest position of the piston in step with brake-lining wear to maintain a substantially constant brake play. This self-adjusting means preferably comprises a friction member unidirectionally slidable along the rod and engaged, with a lost motion establishing the brake play, by the piston. Means is also provided between piston and rod to limit or prevent rotation of the piston in the housing.

The above and other objects, features and advantages of the present invention will become more readily apparent from the following description, reference being made to the accompanying drawing in which.

Figure 1:
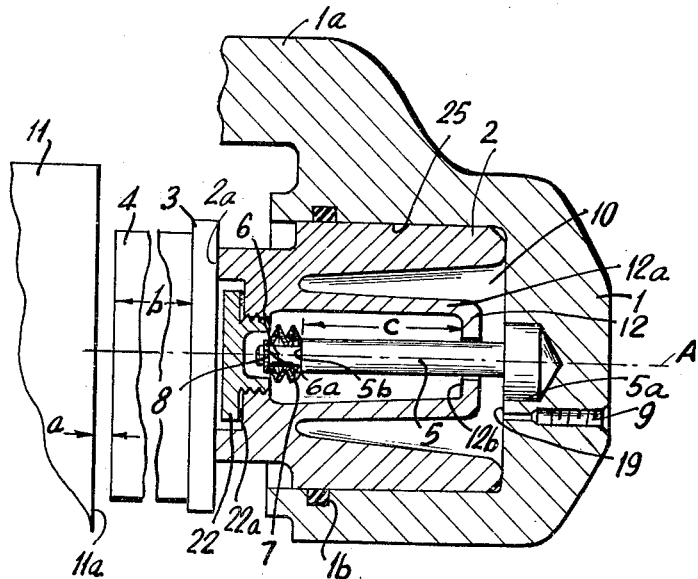
FIG. 1 is an axial cross-sectional view through a portion of a wheel-brake cylinder of a disk brake embodying the present invention.

In FIG. 1, I show a wheel-brake cylinder 1, constituting one lobe of a disk-brake yoke, extending around the periphery of a disk 11 connected to the wheel of an automotive vehicle. The cylinder chamber 10 has an axis A extending perpendicularly to the braking face 11a of the disk 11 and supplied with brake fluid from a conventional master cylinder via a port 9. Within the cylinder 1, a piston 2 is axially shiftable under brake-fluid pressure toward the braking face 11a of the disk and is provided with an annular face 2a bearing against the backing plate 3 of a brakeshoe whose lining 4 is juxtaposed with the braking face 11a of the disk and is composed of a wearable material of high frictional coefficient and thermal resistance. The brakeshoe, disk and yoke are of conventional construction and it may be noted that a similar mirror-symmetrical wheel-brake cylinder is provided along the opposite braking face of the disk and is connected to the cylinder 1 by the bridge piece 1a of the yoke. According to this invention, a rod or pin 5 is press-fitted into a recess 5a in the rear wall 19 of chamber 10 and extends axially therefrom into the hollow piston which is closed at its forward end by a plug 22 threaded into the piston 2 and clamping a sealing ring 22a thereagainst. At its forward end, the rod 5 is provided with a reduced-diameter stud 6 carrying a stack of Belleville washers or dished-disk springs 7 in back-to-back relationship, the stack 7 being retained under precompression between a split ring 8 fitted into a circumferential groove 6a and the left-hand end of this stud and the shoulder 5b formed between the stud and the shank portion of the rod or pin 5. The piston 2 is sealed with respect to the cylinder wall 25 by a conventional ring 1b and carries a central sleeve 12a with an inwardly turned annular flange 12 surrounding the rod 5 with slight clearance and forming at its inner surface 12b an abutment engageable with the cylinder stop formed by the stack 7. The thickness of the brake lining 4 is indicated at b while the normal brake play is represented at a, the brake play constituting the stroke of the brakeshoe until it shiftably engages the braking face 11a of the disk. The axial stroke of piston 2, until it engages the resilient stop 7, is represented at c. In accordance with the principles of the present invention $$c \cong a+b$$

i.e. the stroke of the piston 2 before it is yieldably immobilized as a result of brake wear is approximately equal to (or slightly less than) the full permissible wear of the lining (b) plus the brake play (a).

During brake operation, the brake fluid is forced into chamber 10 behind the piston 2 from the master cylinder with a force which is applied in parallel to both brake cylinders of a respective yoke. The piston 2 is shifted to the left (FIG. 1) and forces the brakeshoe 3, 4 against the juxtaposed braking face 11a of the disk. Initially, the brakeshoe moves through the distance a until it engages the disk and thereafter is applied with the braking force thereto. When the brake lining 4 has been frictionally abraded or eroded to the extent that the surface 12b of the piston bears against the prestressed or preloaded spring stop 7, the other brakeshoe is preferentially urged against the disk since the force required for incremental displacement of piston 2 increase sharply with the degree of compression of the spring stop 7. A uniform wear of both linings is thus achieved. Furthermore, each subsequent brake-operation stroke brings the piston 2 to bear against the spring stop 7 which, upon release of the brake, forces the piston back and therefore creates a brake play which gradually exceeds the normal play a and corresponds to a greater fluid requirement from the master cylinder. The vehicle operator is rapidly warned of the state of his brakes by the correspondingly increased stroke of the brake pedal.

Figure 2:
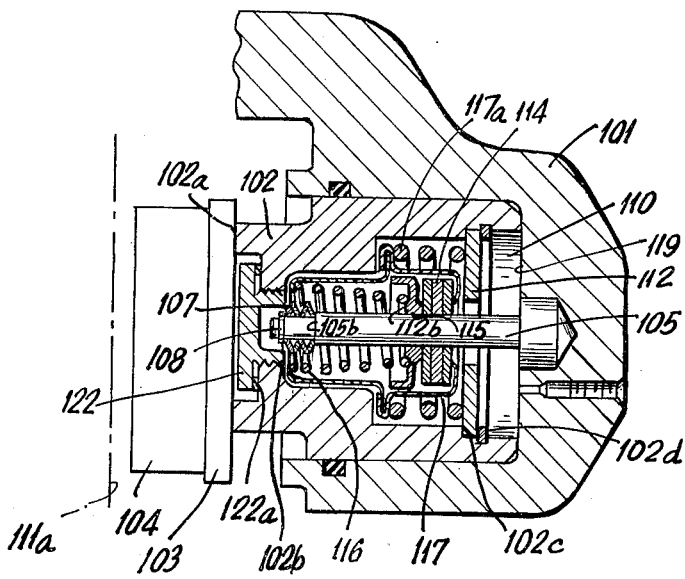
FIG. 2 is an axial cross-sectional view of another wheel-brake cylinder.

In FIG. 2, I show another embodiment of the present invention wherein the braking face of the disk is represented at 111a, it being understood that here, too, a pair of wheel-brake cylinders in mirror-symmetrical configuration is provided to flank the disk in the common yoke. The wheel-brake cylinder 101 slidably receives the piston 102 whose front end 102a bears upon a brakeshoe whose backing plate 103 carries the lining 104. Here, too, the closed front end is provided with an axial opening 102b into which a plug 122 is threadedly inserted and cooperates with a sealing ring 122a. Removal of the plug in the embodiments of FIGS. 1 and 2 affords access to the pin 105 forced into the wall 119 of the cylinder bore 110 when repairs, adjustment or replacement are required. In this embodiment, a self-adjusting mechanism is provided to reset the rest positions of the piston 102 with respect to the housing and the braking face 111a in accordance with brake-lining wear. The self-adjusting mechanism comprises a sheet-metal cage or housing 117 receiving a conical spring 116 which bears axially upon a flanged disk 115 whose forward flank 112b constitutes the abutment (with an annular disk 112) for the resilient stop 107 constituted, as previously described, by a stack of Belleville washers mounted under precompression between a ring 108 and a shoulder 105b of a pin 105. The cage 117 is held in place within the piston 102 by a coil spring 117a bearing upon ring 112, the latter being locked against a shoulder 102c by a split ring 102d seated in an internal circumferential groove of the piston. Within the cage 117, I provide in a conventional manner a number of friction disks 114 of synthetic resin, rubber or the like which tightly hug the pin 105 and are retained between the cage and disk 115 by the pressure of spring 116. Here, too, the distance between face 112b and the stack 107 of Belleville washers should be slightly less than or approximately equal to the thickness of the brake lining 104 and the brake play between this lining and the braking face 111a of the disk. When the brake fluid is supplied to chamber 110 behind the piston 102, the piston urges the brakeshoe 103, 104 against the disk. As a frictional wear erodes the brake lining 104, thereby increasing the brake play determined by the lost motion between disk 112 and the cage 117, this cage progressively advances the disks 114 along the pin 105 during the brake-application stroke of the piston. When the brake pressure is relieved, disks 114 prevent rearward movement of the disk 115 beyond this brake play and thus maintain the piston 102 in its new rest position. Upon substantially complete brake-lining wear, the surface 112b, engages the resilient spring 107 in the manner previously described and no further resetting of the rest position occurs.

Figure 3:
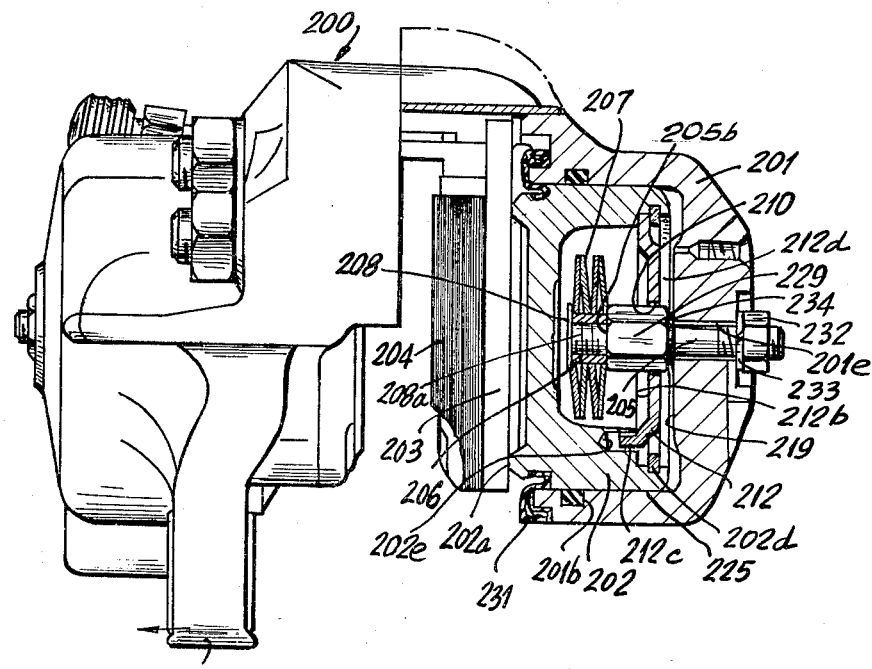
FIG. 3 is an elevational view, partly broken away of a disk brake representing a modification of the systems of FIGS. 1 and 2.

It has been found to be desirable, especially in disk-brake systems to provide means for preventing rotation of the piston about its axis. I have now found that it is possible to combine the improved mechanism for preventing distortion of the braking faces of the disk with means for limiting rotation of the piston in a conventional manner as illustrated, for example, in FIG. 3. FIG. 3 shows a brake yoke 200 whose flange 230 can be secured to the axle housing of the disk and which is provided with a pair of symmetrical cylinders one of which is broken away at 201, on opposite sides of the disk (not shown). Each cylinder 201 slidably receives a piston 202 which bears along its closed annular forward face 202a against the backing plate 203 of a brakeshoe. The lining 204 of this brakeshoe confronts the respective braking face of the disk. An annular dust cap 231 prevents contaminants from entering the chamber 210 of the cylinder 201 whose wall 225 is fitted with a sealing ring 201b in sliding engagement with the piston 202. In this embodiment, the rod 205 extending axially into the piston from the rear wall 219 of the cylinder bore, is held in place by a nut 232, a lock washer 233 and a further lock washer 234 interposed between a hexagonal enlargement 229 which thereby forms a shoulder bearing against the lock washer 234 and the wall 219 of the housing. It will be understood that a separate shoulder can be provided for this purpose and that, instead of a hexagonal section, the rod or pin 205 can be provided between the wall 219 and the stack of Belleville washers 207 with any nonround section (e.g. a section of elliptical, square, rectangular, triangular or other polygonal outline). The Belleville washers 207 are here retained under precompression between the head 208 and the shoulder 205b of the hexagonal section 229 on the reduced diameter portions 206 of the rod by threading a bolt 208a (carrying head 208) into the latter. The abutment of the piston 202 is here formed by a disk 212 whose tongue 212c projects axially into a bore 202e of piston 202 and which is locked in place by a ring 202d. The disk 212 has an opening 212d of hexagonal configuration nonrotatably surrounding the hexagonal section 229 but shitfable therealong while the face 212b of this disk is engageable with the washers 207 as previously noted. The rod or pin 205 passes through the axial bore 201e of the cylinder housing. The system of FIG. 3 operates substantially as previously described with the surface 212b engaging the resilient stop 207 when the lining 204 is substantially completely worn away. It is clear, however, that the piston 202 is nonrotatable in the cylinder housing.

Figure 4:
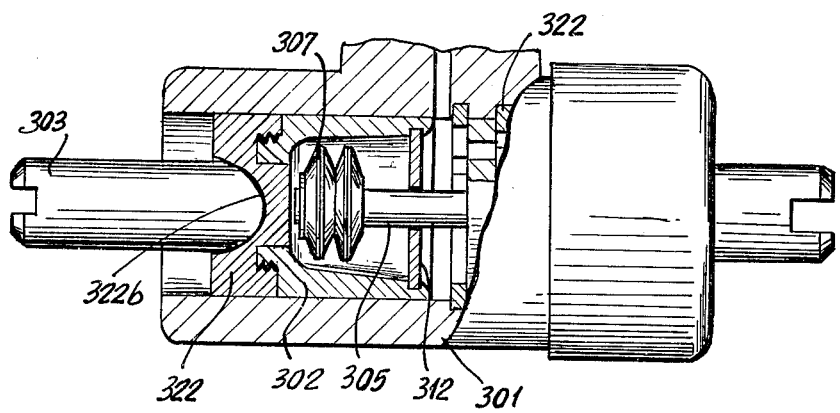
FIG. 4 is a cross-sectional view through a portion of a wheel-brake cylinder for an internal-expansion drum-type brake according to this invention.

The embodiment shown in FIG. 4 has its piston 302 closed by a cap 322 and formed with a socket 322b receiving a force-transmitting pin 303 connecting this wheel-brake clylinder with the brakeshoe of an internal-expanding drum-type brake of conventional construction. Here, the piston 302 carries the disk 312 which is engageable with the precompressed stacked Belleville washers 307 at the end of a rod 305 anchored in the housing 301 between a pair of rings 332. Here, too, the abutment 312 is engageable with the resilent stop 307 upon substantially complete wear of the brake lining.

I claim:
1. A brake cylinder assembly for a brake system having a rotatable braking face adapted to be frictionally engaged to limit rotation thereof relative to the assembly, said assembly comprising:
 housing means forming a fluid-pressurizable brake cylinder;
 a hollow piston shiftable in said cylinder under fluid pressure;
 a brakeshoe having a wearable brake lining interposed between said piston and said face and frictionally enagageable with the latter upon fluid pressurization of said cylinder; and
 means for limiting contact of said brakeshoe with said face upon excessive wear of said brake lining, the last-mentioned means including a rod secured to said housing on a wall thereof and extending in said cylinder and into said piston in the direction of displacement of said piston, said rod having a stepped end remote from said wall with a diameter less than the balance of said rod extending to said wall and adjoining same in an annular shoulder, a resilient stop mounted on said rod, and an annular abutment formed on said piston closely surrounding said balance of said rod between said stepped end and said wall, and engageable with said stop upon fluid pressurization of said cylinder and wear of said brake lining to a predetermined extent, said abutment having an annular face engageable with said stop, said stop being formed as a precompressed stack of Bellville washers on said stepped end of said rod, and an annular retainer on said rod axially spaced from said shoulder and clamping said stack of Belleville washers captively between said retainer and said shoulder for engagement by said surface.

2. The assembly defined in claim 1 wherein said piston has a closed forward end remote from said abutment in force-transmitting relationship with said brakeshoe, said forward end being formed with a threaded closure removable to afford access to said rod and said stop through said piston.

3. The assembly defined in claim 1 wherein said abutment is formed by an annular disk locked to said piston at its axial extremity remote from the end of said brakeshoe, said assembly further comprising self-adjusting means entrainable by said piston and in frictional engagement with said rod for resetting a rest position of said piston in dependence upon wear of the brake lining to maintain a substantially constant brake play, said self-adjusting means including friction disks mounted on said rod between said surface and said stack of washers.

4. The assembly defined in claim 1 wherein said balance of said rod is an axially extending section of nonround configuration between said stop and said housing, said abutment having an opening of a configuration complementary to that of said section and axially shiftable therealong for preventing rotation of said piston relative to said rod.

5. The assembly defined in claim 1 wherein said assembly is a wheel-brake cylinder for a disk brake of an automotive vehicle, said piston has a closed end bearing upon said brakeshoe, and said abutment is spaced from said stop by a distance approximately equal to the thickness of said brake lining plus the play of the brakeshoe.

References Cited

UNITED STATES PATENTS 2,717,745  9/1955  Carter.
3,032,144  5/1962  Stanton.

FOREIGN PATENTS 1,187,506  2/1965  Germany.
728,251  4/1955  Great Britain.
995,326  6/1965  Great Britain.

GEORGE E. A. HALVOSA, Primary Examiner

U.S. Cl. X.R.

188—1, 196; 192—111